US011276387B2

(12) United States Patent
Christian et al.

(10) Patent No.: US 11,276,387 B2
(45) Date of Patent: Mar. 15, 2022

(54) PROXIMITY COMPENSATION FOR REMOTE MICROPHONE ANC ALGORITHM

(71) Applicant: HARMAN INTERNATIONAL INDUSTRIES, INCORPORATED, Stamford, CT (US)

(72) Inventors: Jonathan Wesley Christian, Mineral, VA (US); Tao Feng, Novi, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 15/733,981

(22) PCT Filed: May 31, 2019

(86) PCT No.: PCT/US2019/034945

§ 371 (c)(1),
(2) Date: Dec. 1, 2020

(87) PCT Pub. No.: WO2019/232400

PCT Pub. Date: Dec. 5, 2019

(65) Prior Publication Data

US 2021/0217401 A1 Jul. 15, 2021

Related U.S. Application Data

(60) Provisional application No. 62/679,275, filed on Jun. 1, 2018.

(51) Int. Cl.

| | |
|---|---|
| ***H04B 1/00*** | (2006.01) |
| ***G10K 11/178*** | (2006.01) |
| *G10K 11/16* | (2006.01) |

(52) U.S. Cl.

CPC .. *G10K 11/17881* (2018.01); *G10K 11/17813* (2018.01); *G10K 2210/1082* (2013.01); *G10K 2210/1282* (2013.01); *H04R 2499/13* (2013.01)

(58) Field of Classification Search

CPC ....... G10K 11/17881; G10K 11/17813; G10K 2210/1082; G10K 2210/1282; H04R 2499/13

USPC .................................................. 381/86, 71.4

See application file for complete search history.

(56) References Cited

U.S. PATENT DOCUMENTS

| | | | | |
|---|---|---|---|---|
| 9,305,541 | B2 * | 4/2016 | Caillet | B60N 2/879 |
| 2017/0032806 | A1 * | 2/2017 | Konjeti | G10L 25/84 |
| 2017/0061951 | A1 * | 3/2017 | Starobin | G10K 11/17853 |
| 2018/0047383 | A1 | 2/2018 | Hera et al. | |

FOREIGN PATENT DOCUMENTS

| | | | |
|---|---|---|---|
| DE | 102014201228 | A1 | 8/2014 |
| DE | 102015119494 | A1 | 5/2016 |

* cited by examiner

*Primary Examiner* — Ammar T Hamid

(74) *Attorney, Agent, or Firm* — Brooks Kushman, P.C.

(57) ABSTRACT

A remote microphone system for a vehicle may include at least one physical microphone arranged within a vehicle cabin configured to generate an error signal at a virtual microphone location within the vehicle, a database configured to maintain a look up table of premeasured seat positions and associated transfer functions, and a processor. The processor may be configured to receive a seat position indicative of a seat location within the vehicle, and apply a transfer function associated with the premeasured position to a primary noise signal of the at least one physical microphone to generate the error signal.

13 Claims, 5 Drawing Sheets

PROXIMITY COMPENSATION FOR REMOTE MICROPHONE ANC ALGORITHM

CROSS-REFERENCE TO RELATED APPLICATION

This application is the U.S. national phase of PCT Application No. PCT/US2019/034945 filed on May 31, 2019, which claims the benefit of U.S. Provisional Application No. 62/679,275 filed Jun. 1, 2018, the disclosures of which are hereby incorporated in their entirety by reference herein.

TECHNICAL FIELD

Disclosed herein are methods and systems relating to proximity compensation for remote microphone techniques.

BACKGROUND

Vehicles often include active noise cancelation (ANC) technologies to reduce ambient noise within the vehicle cabin. Such ANC technologies may require various microphones to be placed within the vehicle cabin. These microphones may aid the ANC system in generating an error signal. However, often times it is not practical to have a physical microphone present at certain locations within the vehicle cabin in these cases, remote microphone technology may be used.

SUMMARY

A remote microphone system for a vehicle may include at least one physical microphone arranged within a vehicle cabin configured to generate an error signal at a virtual microphone location within the vehicle, a database configured to maintain a look up table of premeasured seat positions and associated transfer functions, and a processor. The processor may be configured to receive a seat position indicative of a seat location within the vehicle, and apply a transfer function associated with the premeasured position to a primary noise signal of the at least one physical microphone to generate the error signal.

A remote microphone system for estimating an error signal for noise cancelation within a vehicle may include at least one physical microphone arranged within a vehicle cabin configured to generate an error signal at a virtual microphone location within the vehicle at a vehicle seat, a database configured to maintain a look up table of premeasured seat positions and associated transfer functions, and a processor. The processor may be configured to receive a seat position of the vehicle seat, and apply a transfer function associated with the seat position to a primary noise signal of the at least one physical microphone to generate the error signal.

A method for estimating an error signal for a virtual microphone for noise cancelation within a vehicle may include receiving a seat position of a vehicle seat, determining whether the seat position corresponds to a premeasured seat position, and applying a transfer function associated with the seat position to a primary noise signal of at least one physical microphone to generate an error signal.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present embodiments are disclosed herein; however, it is to be understood that the disclosed embodiments are merely exemplary of the embodiments that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Traditionally, remote microphone techniques take the physical microphones within the vehicle and applicate an error signal at a location where there is no physical microphone. This remote or virtual location is often in an area targeted to be the occupant's ear. This remote microphone technique involves a preliminary stage where measurements are made with microphones at the physical and virtual locations whereby the relationship between these two locations is identified. A transfer function between these two locations is created, either from a primary noise measurement or via an acoustic transfer function method using an omnidirectional source. This transfer function can exist either from a single physical microphone to a single virtual microphone, or with multiple physical microphones to a single virtual microphone. The latter example may be used as often a single physical microphone cannot always approximate the signal at the virtual location.

However, existing remote microphone technologies assume a fixed location between the physical and virtual microphone. This may not be the case when an occupant moves or adjusts his or her seat. Upon such movement of the seat, so does the occupant's ear location, and thus rendering the virtual location of the virtual microphone inaccurate. This may affect the cancellation performance and stability of the ANC system.

Described herein is system that determines a transfer function of a virtual microphone based on an occupant's seat position. Certain seat positions may be premeasured and associated with transfer functions. Thus, the transfer function may be determined and selected based on a current seat position. This may be done by comparing the seat location to a set of premeasured positions. If the seat location corresponds to one of the premeasured positions, then the transfer function associated with the premeasured position is selected. If the seat location does not correspond to one of the premeasured positions, then the transfer function will be interpolated between the premeasured positions. That is, if the seat position is between a first premeasured position and a second premeasured position, then the transfer function will be selected based on an interpolation of the transfer functions associated with each of the first and second premeasured positions.

Figure 1:
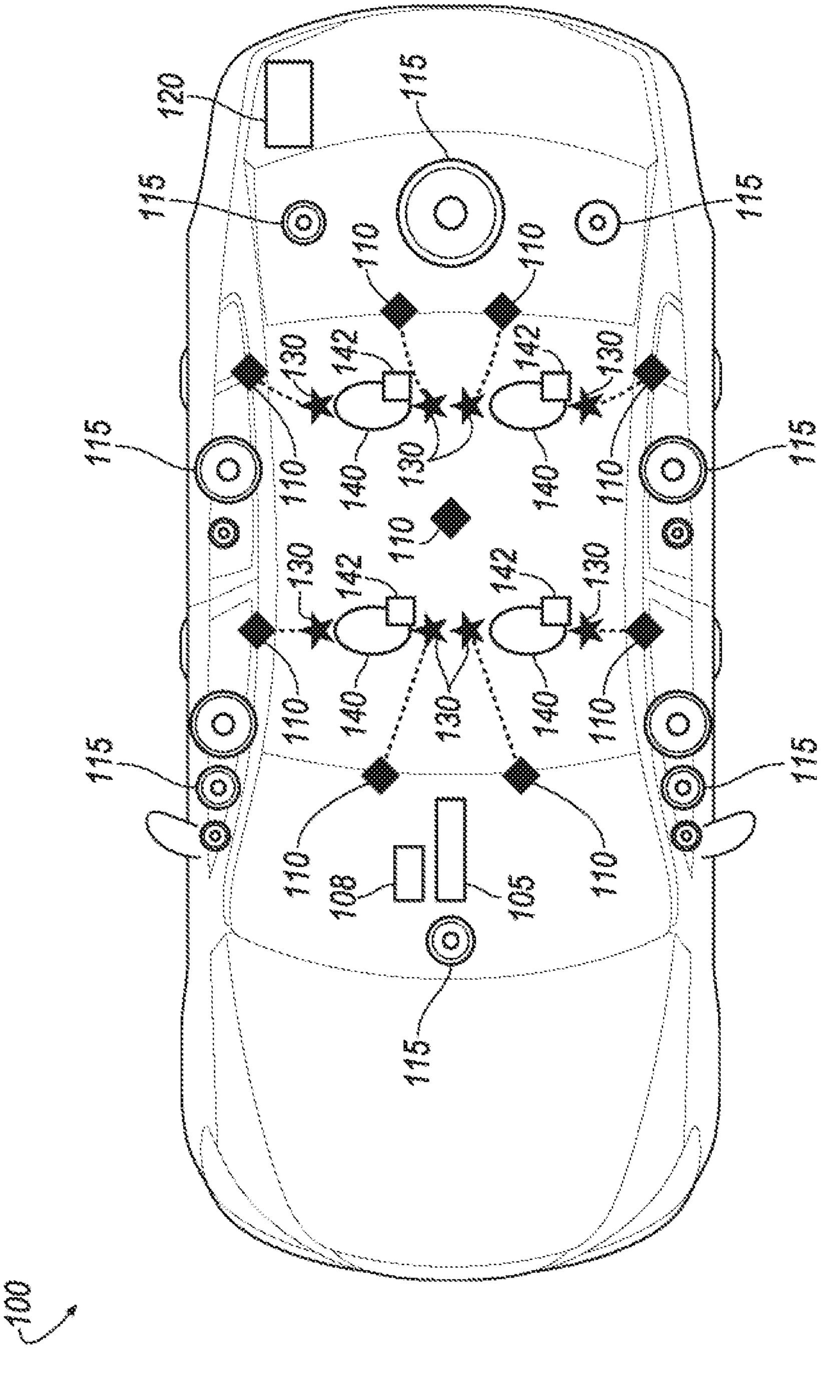
FIG. 1 illustrates an example proximity compensation system for remote microphone technology (RMT)

FIG. 1 illustrates an example proximity compensation system 100 for remote microphone technology (RMT). The system 100 may be included in a vehicle 102 and include a processor 105 configured to carry out the methods and processes described herein. The processor 105 may include a controller (shown as controller 105 in FIG. 2) and memory 108, as well as other components specific for audio processing within the vehicle 102. The processor 105 may be one or more computing devices such as a quad core processor for processing commands, such as a computer processor, microprocessor, or any other device, series of devices or other mechanisms capable of performing the operations discussed herein. The memory may store instructions and commands. The instructions may be in the form of software, firmware, computer code, or some combination thereof. The memory may be in any form of one or more data storage devices, such as volatile memory, non-volatile memory, electronic memory, magnetic memory, optical memory, or any other form of data storage device. In one example, the memory may include 2 GB DDR3, as well as other removable memory components such as a 1.28 GB micro SD card.

The memory 108 may store a look up table of transfer functions to be applied and associated with various seat locations and positions. These premeasured transfer functions may be associated with a premeasured position. If the seat position corresponds to one of the premeasured positions, then the transfer function $\hat{H}(z)$ associated with the premeasured position is selected. If the seat position does not correspond to one of the premeasured positions, then a transfer unction $\hat{H}(z)$ may be interpolated between the premeasured positions. That is, if the seat position is between a first premeasured position and a second premeasured position, then the transfer function $\hat{H}(z)$ will be selected based on an interpolation of the transfer functions $\hat{H}(z)$ associated with each of the first and second premeasured positions.

The processor 105 may be in communication with at least one physical microphone 110. In the example in FIG. 1, the physical microphone 110 may include a plurality of physical microphones 110. The system 100 may include speakers 115. The speakers 115 may be arranged throughout the vehicle to provide audio to the vehicle cabin. The speakers 115 may include various drivers includes mid-range drivers, tweeters and woofers. These speakers 115 may be arranged throughout the vehicle. The system 100 may also include an amplifier 120.

The vehicle 102 may include various vehicle seats 140. These seats 140 may be areas where passengers and occupants typically sit during use of the vehicle. As explained above, RMT technology may include virtual microphone locations. FIG. 1 illustrates at least one virtual microphone location. As explained, the virtual microphone location may be a location near an occupant's ear. Each seat 140 may have at least one virtual microphone 130 at a virtual microphone location associated with it. In the example in FIG. 1, each seat 140 has two virtual microphones 130 associated therewith, one on either side of the seat 140.

Each seat 140 may include at least one sensor 142 configured to detect the seat position. The seat location may be the relative position of the seat 140 within the vehicle 102. Vehicle seats 140 may be adjusted vertically, laterally, axially, horizontally, etc. The seat location may include one or more of a vertical, lateral, axial, positions. The one or more sensors 142 may provide the processor 105 with the seat location. The look up table within the memory 108 may then in turn be used to associate a transfer function $\hat{H}(z)$ with a premeasured seat position.

Figure 2:
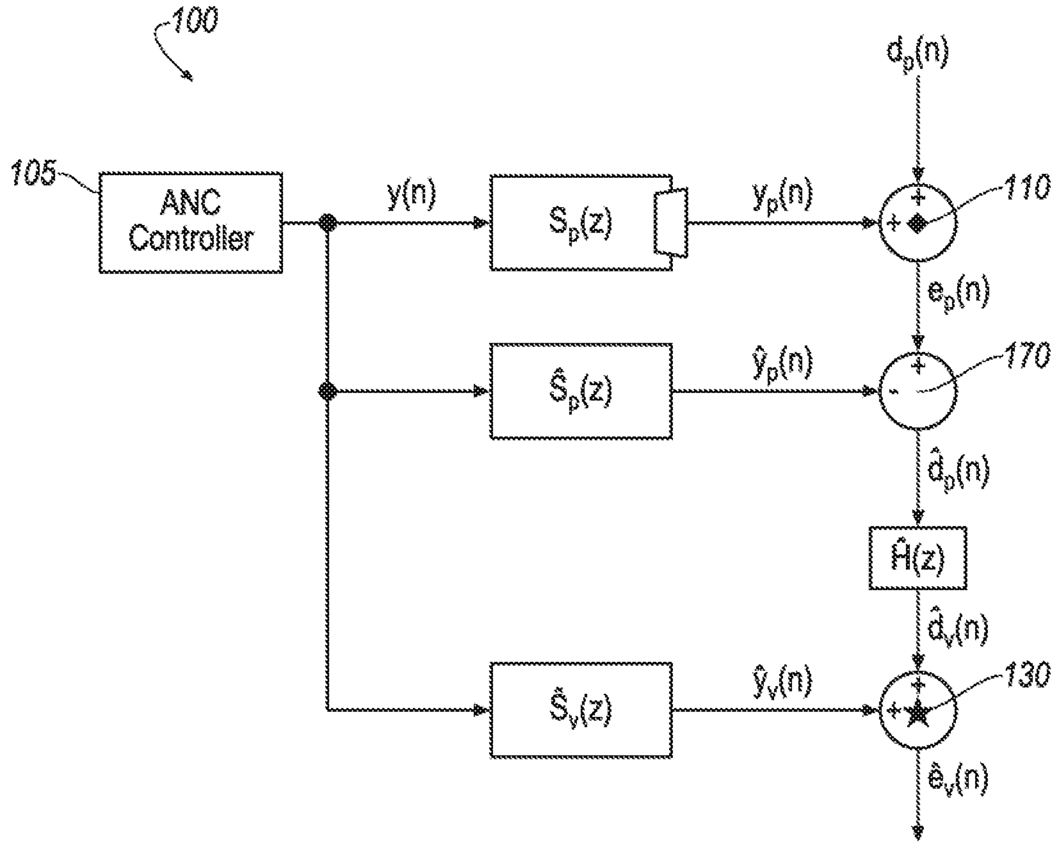
FIG. 2 illustrates an example remote microphone technology diagram for the system of FIG. 1.

FIG. 2 illustrates an example remote microphone technology diagram for the system 100 of FIG. 1. The system 100, as explained, may include a processor 105, also described herein as a controller 105. The various signals and paths provided in FIG. 2 include:

| | |
|---|---|
| $y(n)$ | Control signal |
| $S_p(z)$ | Secondary (electroacoustic) path |
| $y_p(n)$ | Secondary (antinoise) signal |
| $d_p(n)$ | Primary noise source signal |
| $\hat{S}_p(z)$ | Estimated secondary (electroacoustic) path** |
| $\hat{y}_p(n)$ | Estimated antinoise signal |
| $e_p(n)$ | Error assessed at the physical mic location |
| $\hat{d}_p(n)$ | Estimated primary noise signal at the physical location |
| $\hat{H}(z)$ | Estimated transfer function between physical and virtual mic(s) |
| $\hat{S}_v(z)$ | Estimated secondary (electroacoustic) path to the virtual mic** |
| $\hat{d}_v(n)$ | Estimated primary noise signal at the virtual location |
| $\hat{y}_v(n)$ | Estimated antinoise signal at the virtual location |
| $\hat{e}_v(n)$ | Estimated error at the virtual location |
| n | Time sample |
| z | Frequency |

The controller 105 may output a control signal y(n) to a secondary path $S_p(z)$. The secondary path $S_p(z)$ may produce an anti-noise signal $y_p(n)$ to the physical microphone 110. The controller 105 may provide the control signal y(n) to an estimated secondary (electroacoustic) path $\hat{S}_p(z)$ to the virtual microphone 130. The estimated secondary path may provide an estimated anti-noise signal $\hat{y}_p(n)$ at the virtual microphone 130.

The physical microphone 110 may receive a primary noise source signal $d_m(n)$ and the secondary anti-noise signal $y_m(n)$ and output an error signal $e_m(n)$ assessed at the physical microphone location. The estimated anti-noise signal $\hat{y}_e(n)$ may be removed or subtracted from the error signal $e_m(n)$ at 170 to provide an estimated primary noise signal $\hat{d}_e(n)$ at the physical location at 110.

An estimated transfer function $\hat{H}(z)$ may be applied to the estimated primary noise signal $\hat{d}_e(n)$ at the physical location 110 and produce an estimated primary noise signal $\hat{d}_v(n)$ at the virtual microphone 130. This transfer function $\hat{H}(z)$ may be generated and determined based on a preliminary identification stage or interpolation between the stored transfer functions $\hat{H}(z)$ between the physical and virtual microphones so that cancellation performance is maintained and stability is not an issue if the occupant moves their seat 140. This is described in more detail below. Because the transfer function is based on the seat location, the transfer function is especially relevant to the location of the virtual microphone 130.

The controller 105 also provides the control signal y(n) to an estimated secondary (electroacoustic) path to the virtual microphone 130. The estimated secondary path to the virtual microphone 130 may provide an estimated anti-noise signal at the virtual location to the virtual microphone 130. The virtual microphone 130 may receive the estimated primary noise signal at the virtual location, add it to the estimated anti-noise signal at the virtual location, and provide an estimated error at the virtual microphone location.

Figure 3:
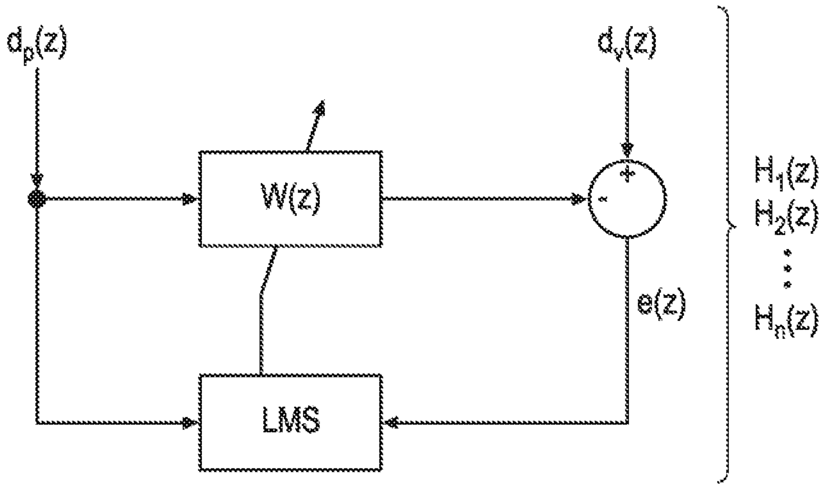
FIG. 3 illustrates an example schematic for approximating the transfer function for the RMT.

FIG. 3 illustrates an example schematic for approximating the transfer function using adaptive filters and a least mean square (LMS) optimization routine to calculate the coefficients of the finite impulse response (FIR) filters that represent the transfer function. This method may also be related to either the primary noise signals or the secondary path. In this example transfer function, the filter coefficients may change as the seat locations change.

Additionally or alternatively, the transfer function may be approximated as a ratio of cross spectral density (physical to virtual signals) and the auto spectral density (physical signal) of the primary noise signals, represented by:

$$H(z) = \frac{S_{pv}(z)}{S_{pp}(z)}$$

The above example transfer function may be dependent on the linearity of the primary noise signals and is application dependent.

Referring to FIG. 3, the use of LMS to approximate the transfer function allows the system 100 to store multiple filter coefficients based on the seat location. This may include multiple measurements in the preliminary identification stage. The controller 105 may recognize a seat location as being one of a plurality of premeasured positions. The controller 105 may retrieve the transfer function $\hat{H}(z)$ based on the recognized seat location. Alternatively, a series of discrete transfer functions $\hat{H}(z)$ could be measured and then interpolated between as the seat 140 is moved along the premeasured positions.

Thus, the transfer function $\hat{H}(z)$ may be determined and selected based on the seat position. This may be done by comparing the seat location to the premeasured positions. If the seat location corresponds to the premeasured positions, then the transfer function $\hat{H}(z)$ associated with the premeasured position is selected. If the seat location does not correspond to one of the premeasured positions, then the transfer function $\hat{H}(z)$ will be interpolated between the premeasured positions. That is, if the seat position is between a first premeasured position and a second premeasured position, then the transfer function $\hat{H}(z)$ will be selected based on an interpolation of the transfer functions $\hat{H}(z)$ associated with each of the first and second premeasured positions.

Current head tracking methods are more cumbersome and many vehicles are not equipped with such capabilities. This mechanism avoids the needs for a specific head tracking device, camera, ultrasonic sensors, etc., and uses existing elements.

Figure 4:
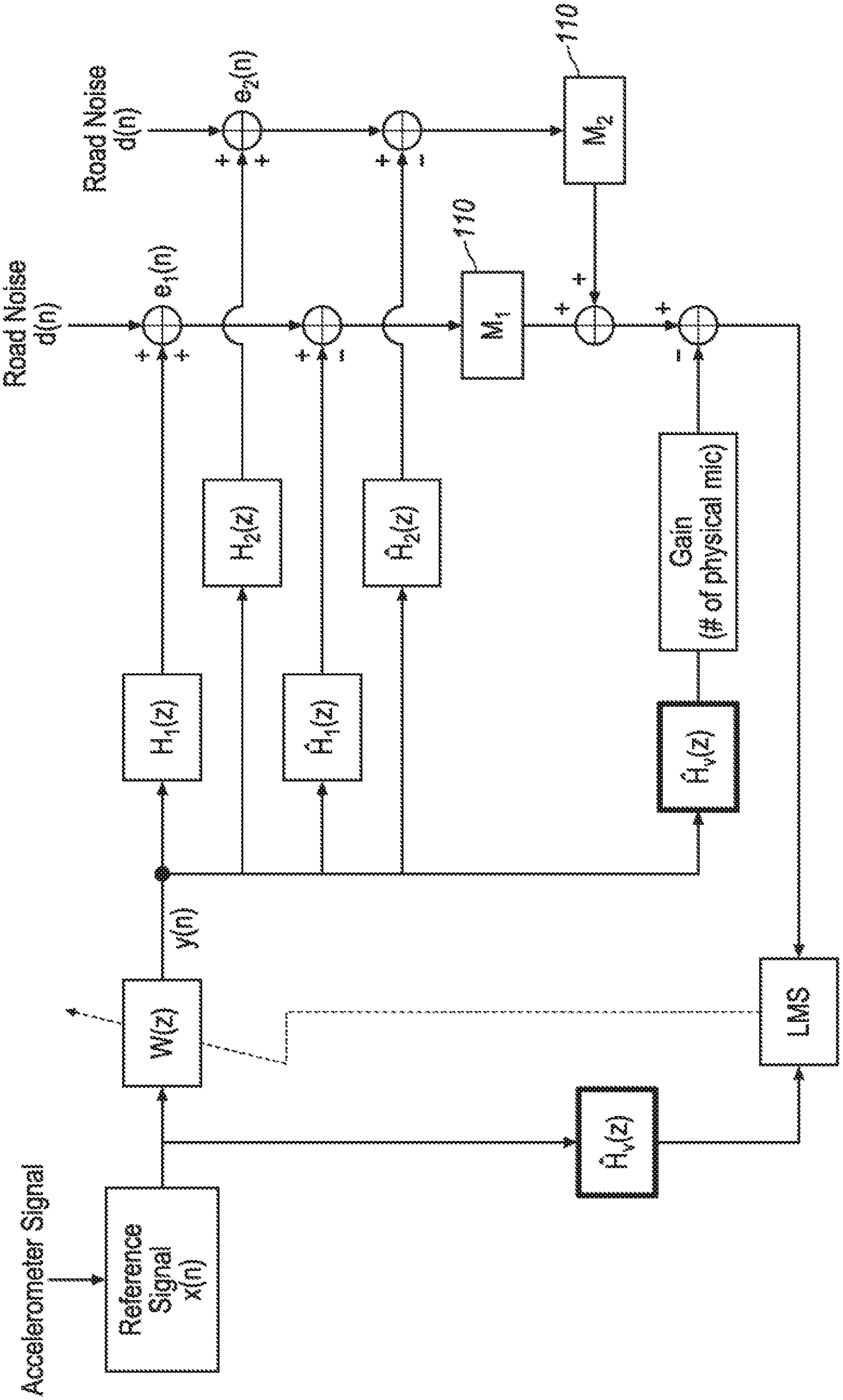
FIG. 4 illustrates an example schematic illustrating the use of the transfer function.

FIG. 4 illustrates an example schematic illustrating the use of the transfer function $\hat{H}(z)$ between the physical and virtual microphones that changes with the seat position. In the example of FIG. 4, two physical microphones 110 and one virtual microphone 130 (not shown in FIG. 4), may be used. In FIG. 4, $M_1$ and $M_2$ are transfer functions between the physical and virtual microphone 130 that changes with seat position.

Figure 5:
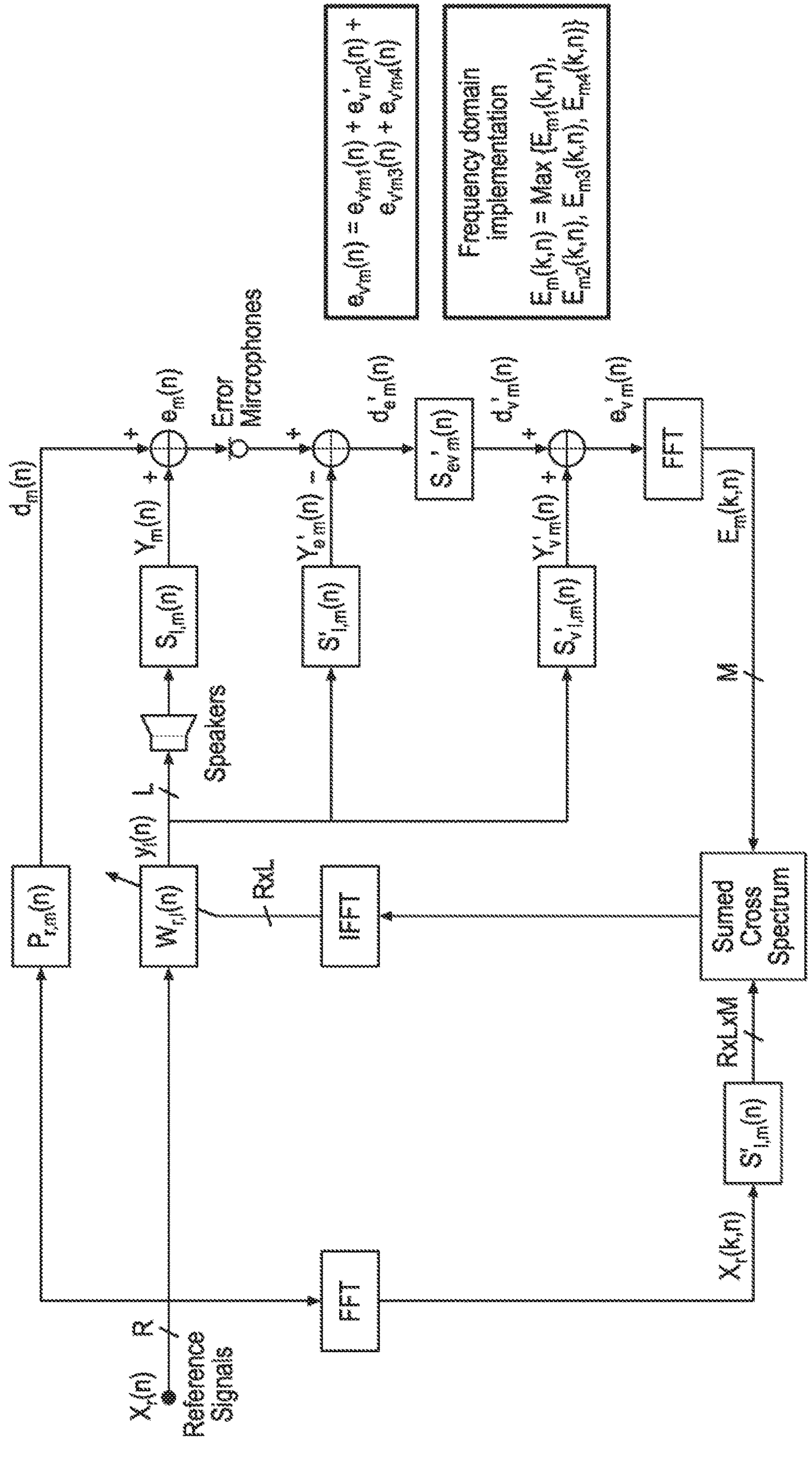
FIG. 5 illustrates another example schematic illustrating the use of the transfer function.

FIG. 5 illustrates another example schematic illustrating the use of the transfer function $\hat{H}(z)$ between the physical and virtual microphones that changes with the seat position. Multiple physical microphones may be used for virtual microphone prediction. The estimated secondary path $S_{l,m}(n)$ may provide an estimated anti-noise signal $y_m(n)$ at the virtual microphone 130. The physical microphone 110 may receive a primary noise source signal $d_{e'm}(n)$ and the secondary anti-noise signal $y_{v'm}(n)$ and output an error signal $e_{v'm}(n)$ assessed at the physical microphone location. A Fast Fourier Transform may be applied to the error signal $e_{v'm}(n)$. Other summed cross spectrum, Fast Fourier Transform, Inverse Fast Fourier Transform, matrices, etc may also be used in the proximity compensation.

Figure 6:
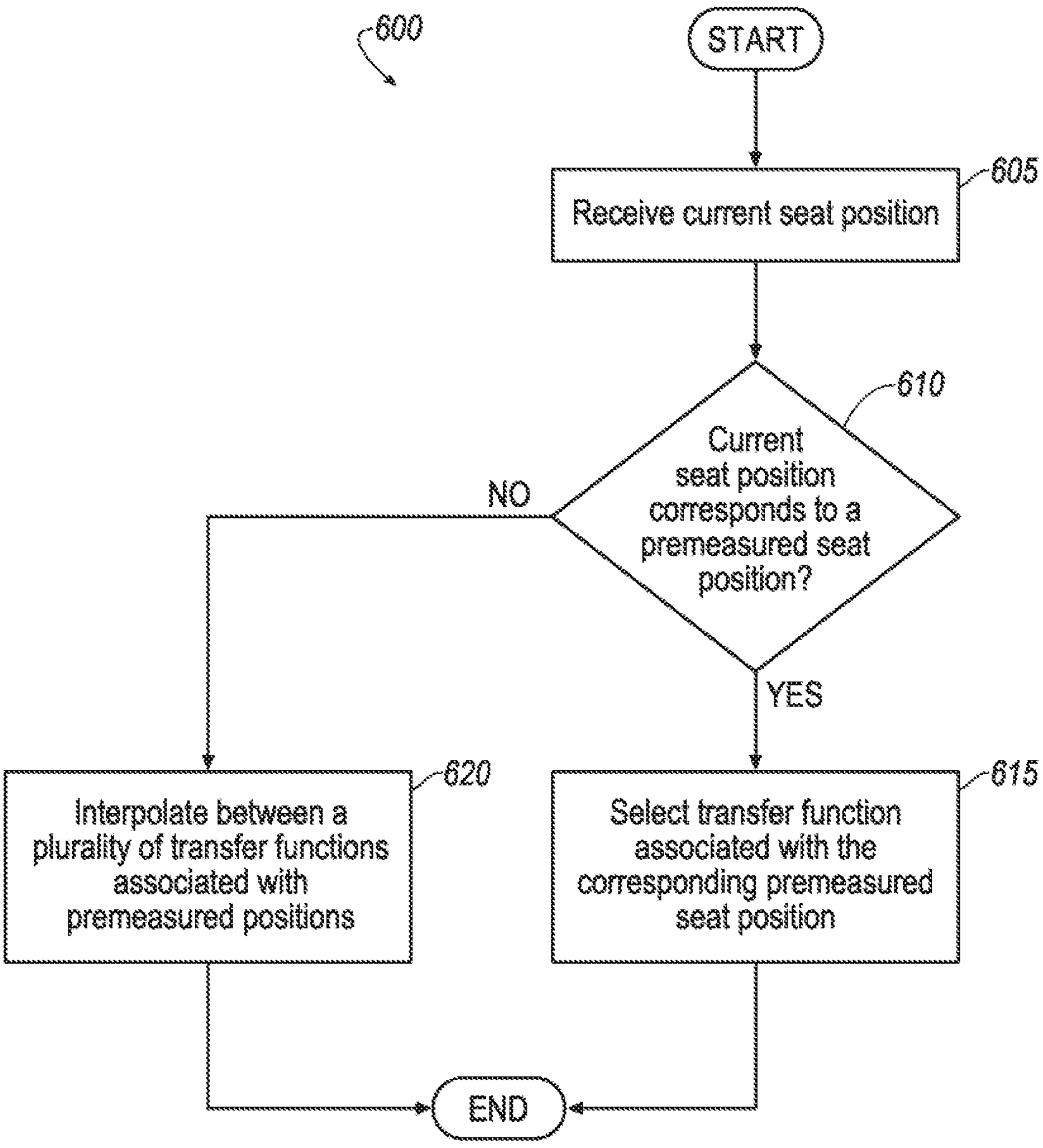
FIG. 6 illustrates an example process for determining the transfer function.

An estimated transfer function $\hat{H}(z)$ may be applied to the estimated primary noise signal $\hat{d}_e(n)$ at the physical location 110 and produce an estimated primary noise signal $\hat{d}_v(n)$ at the virtual microphone 130. FIG. 6 illustrates an example process 600 for determining the transfer function $\hat{H}(z)$. This process 600 may be carried out by the controller/processor 105. The process 600 may begin at block 605 where the controller 105 may receive the current seat position from one of the seats 140.

At block 610, the controller 105 may determine whether the current seat position corresponds to a premeasured seat position. If so, the process 600 proceeds to block 615. If not, the process 600 proceeds to block 620.

At block 615, the controller 105 selects the transfer function $\hat{H}(z)$ associated with the corresponding premeasured seat position.

At block 620, the controller 105 selects the transfer function $\hat{H}(z)$ based on an interpolation of at least two known premeasured positions. That is, the transfer function may be determined by selecting a transfer function between the transfer functions corresponding to two known premeasured functions.

The process 600 then ends.

The embodiments of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices may be configured to execute a computer-program that is embodied in a non-transitory computer readable medium programmed to perform any number of the functions as disclosed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A remote microphone system for a vehicle comprising:

at least one physical microphone arranged within a vehicle cabin configured to generate an error signal at a virtual microphone location within the vehicle;

a database configured to maintain a look up table of premeasured seat positions and associated transfer functions;

a processor configured to receive a seat position indicative of a seat location within the vehicle;

determine whether one of the premeasured positions correspond to the seat position;

in response to one of the premeasured positions not corresponding to the seat position, interpolate the transfer function from at least two known premeasured positions; and apply the transfer function interpolated from the at least two known premeasured positions to a primary noise signal of the at least one physical microphone to generate the error signal.

2. The system of claim 1, wherein the transfer function includes filter coefficients specific to the seat position.

3. The system of claim 2, wherein the filter coefficients are determined at least in part by a least mean square (LMS) optimization routing.

4. The system of claim 1, wherein the transfer function is linearly dependent on the primary noise signal.

5. The system of claim 1, wherein the primary noise signal is generated based on a source signal at the physical microphone and an antinoise signal.

6. The system of claim 1, wherein the virtual microphone location includes two virtual microphone locations, one at each side of the seat.

7. A remote microphone system for estimating an error signal for noise cancelation within a vehicle comprising:

at least one physical microphone arranged within a vehicle cabin configured to generate an error signal at a virtual microphone location within the vehicle at a vehicle seat;

a database configured to maintain a look up table of premeasured seat positions and associated transfer functions;

a processor configured to receive a seat position of the vehicle seat;

determine whether one of the premeasured seat positions correspond to the seat position;

in response to one of the premeasured positions not corresponding to the seat position, interpolate the transfer function from at least two known premeasured positions; and apply the transfer function interpolated from the last two known seat positions to a primary noise signal of the at least one physical microphone to generate the error signal.

8. The system of claim 7, wherein the transfer function includes filter coefficients specific to the seat position.

9. The system of claim 8, wherein the filter coefficients are determined at least in part by a least mean square (LMS) optimization routing.

10. The system of claim 7, wherein the transfer function is linearly dependent on the primary noise signal.

11. The system of claim 7, wherein the primary noise signal is generated based on a source signal at the physical microphone and an antinoise signal.

12. The system of claim 7, wherein the virtual microphone location includes two virtual microphone locations, one at each side of the seat.

13. A method for estimating an error signal for a virtual microphone for noise cancelation within a vehicle comprising:

receiving a seat position of a vehicle seat;

determining whether the seat position corresponds to a premeasured seat position;

in response to the seat position not corresponding to the premeasured seat position, interpolating the transfer function from at least two known premeasured positions; and applying a transfer function associated with the seat position to a primary noise signal of at least one physical microphone to generate an error signal.

* * * * *